Patented Dec. 31, 1940

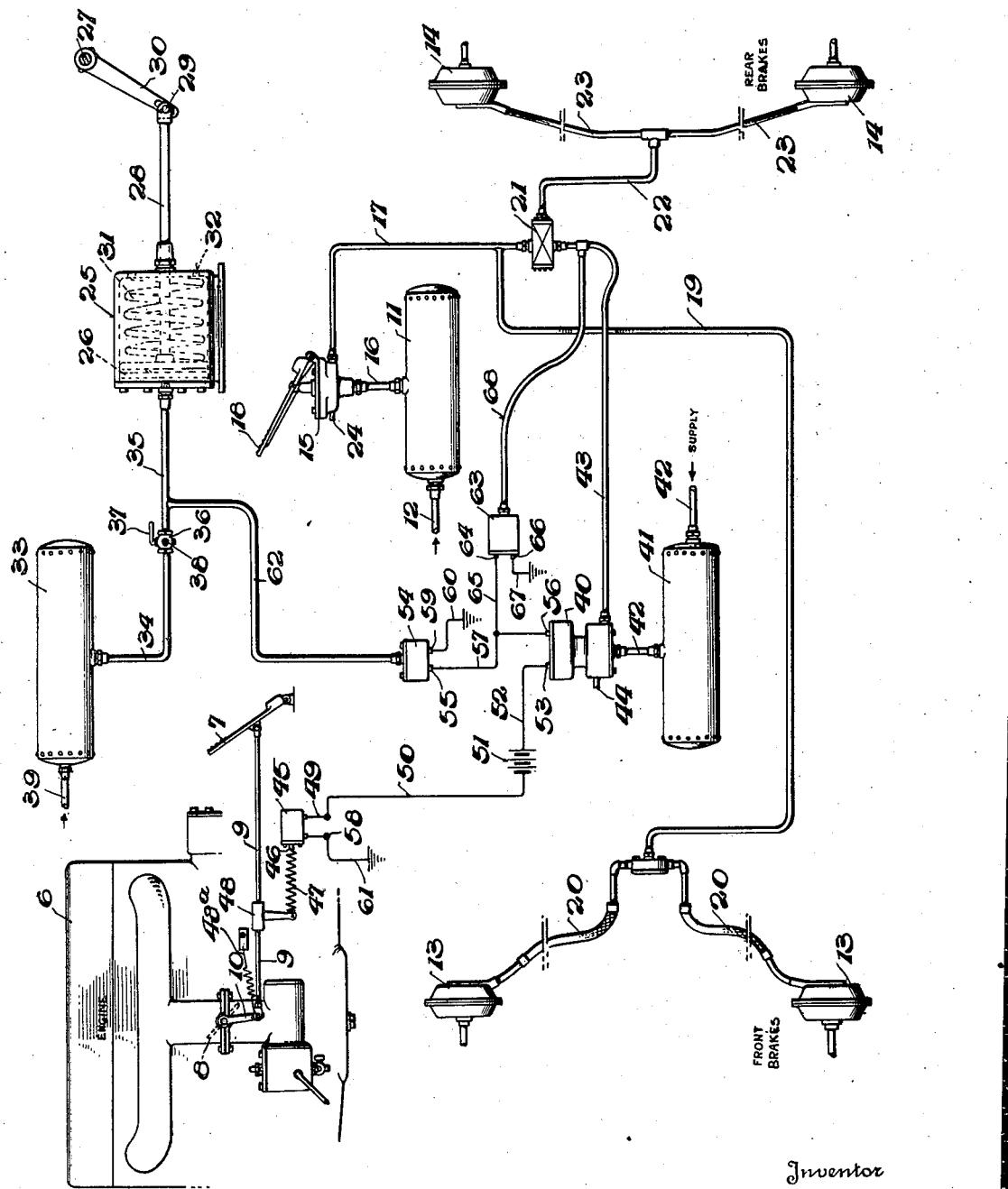

2,226,671

UNITED STATES PATENT OFFICE 2,226,671

CONTROL MECHANISM

Roy S. Sanford, Pittsburgh, Pa., assignor to Bendix-Westinghouse Automotive Air Brake Company, Pittsburgh, Pa., a corporation of Delaware Application July 13, 1939, Serial No. 284,376

12 Claims. (Cl. 192—3)

This invention relates to a motor vehicle-controlling mechanism and more particularly to a construction for interrelating the brake control, door control and vehicle motor accelerator systems.

One of the objects of the invention is to provide novel means for applying the vehicle brakes through manipulation of the door control mechanism and accelerator.

Another object is to provide, in a mechanism of the above type, means controlled by operation of the door control mechanism and accelerator for holding the brakes applied.

A further object is to provide, in addition to the regular brake control mechanism, an auxiliary brake control mechanism adapted to automatically apply the brakes on opening of the vehicle doors with the accelerator in release position, and adapted to release the brakes on subsequent operation of the accelerator to start the vehicle, thereby enabling the operator to use one foot for operating the accelerator pedal to simultaneously release the brake and control the speed of the vehicle motor.

Still another object is to provide an auxiliary brake control system of the above character wherein the auxiliary system may be electrically controlled in response to desired operations of the door and accelerator control systems.

Other objects and novel features of the invention will appear more fully hereinafter from the following detailed description when taken in connection with the accompanying drawing. It is to be expressly understood, however, that the drawing is employed for purposes of illustration only and is not designed as a definition of the limits of the invention, reference being had for this purpose to the appended claims.

In the drawing, the single figure of which illustrates diagrammatically, certain parts being shown in section, a vehicle control mechanism constructed in accordance with the principles of the present invention, such mechanism is disclosed as applied to a vehicle of conventional type having a motor 6 for driving the vehicle, and an accelerator 7 adapted to control the speed of the motor by virtue of its connection with the throttle valve 8 through rod 9 and lever arm 10. In the illustrated embodiment of the invention, the vehicle is equipped with a service brake system comprising a reservoir 11 receiving fluid pressure through a conduit 12 from a compressor, not shown, and brake chambers 13 and 14 for operating the front and rear brakes respectively, and adapted to be supplied with fluid pressure from reservoir 11 under the control of a manually operable brake valve 15, this valve being preferably constructed as set forth in the patent to Wilfred A. Eaton, No. 2,141,689, dated December 27, 1938. Brake valve 15 is connected to reservoir 11 by conduit 16 and has an outlet conduit 17 which serves, on depression of brake valve pedal 18, to conduct fluid pressure to the front brake chambers 13 through conduits 19 and 20 and to the rear brake chambers 14 through a double check valve 21 and conduits 22 and 23, and, on release of pedal 18, to conduct fluid pressure from the brake chambers, conduits and double check valve above described to the brake valve and thence to atmosphere through a brake valve exhaust port 24. The double check valve 21, which may also be constructed as shown in the above referred to Patent No. 2,141,689, normally acts to maintain continuous communication between conduits 17 and 22.

A door control system is provided having a fluid motor 25 adapted to operate the vehicle door, not shown, by means of a piston 26 connected with a door operating shaft 27 through piston rod 28, pivot pin 29 and lever 30, the door operating parts being normally maintained in door closing position by a spring 31 interposed between piston 26 and end wall 32 of the fluid motor. The motor is operated by fluid pressure from a reservoir 33 connected to the motor by conduits 34 and 35 and a three-way control valve 36 of conventional type having a valve operating handle 37 effective in the position shown to prevent communication between conduits 34 and 35, and effective to connect motor 25 to atmosphere through conduit 35 and an exhaust port 38 and effective, on movement to another position, to close the exhaust port and connect conduits 34 and 35 to permit fluid pressure from the reservoir to actuate the motor and open the vehicle door. It is to be understood that reservoir 33 may be connected to reservoir 11 or to the compressor through conduit 39.

For the purpose of controlling the application and release of the vehicle brakes by means of the door control and accelerator systems hereinbefore described, an auxiliary brake valve 40 having inlet and exhaust valves and preferably of the electropneumatic type shown in Patent No. 2,141,689, heretofore referred to, is provided, this valve acting when energized to control the flow of fluid pressure from a reservoir 41 to the rear brake chambers 14 through conduits 42 and 43, double check valve 21 and conduits 22 and 23, and acting when deenergized to exhaust fluid pressure from the brake chambers through conduits 23 and 22, double check valve 21, conduit 43 and an exhaust port 44 in the valve 40. The reservoir 41 may be connected to the compressor through conduit 42, and it will be evident that operation of valve 40 will supply fluid pressure to the brake chambers 14 at the pressure existing in the reservoir, and, since the service brake valve 15 is normally set to deliver to the brake chambers a lower pressure than that existing in the reservoirs, the pressure differential existing between conduits 17 and 43 on energization of valve 40 will be sufficient to actuate check valve 21 to close off communication between conduits 17 and 22 and to establish communication between conduits 22 and 43, thus preventing loss of fluid pressure from conduits 22 and 43 through conduit 17 and the exhaust port of service brake valve 15. In like manner, the double check valve prevents the exhausting of fluid pressure from conduits 17 and 22 through conduit 43 and exhaust port 44 of the auxiliary brake valve during a service brake application.

When stopping a vehicle, and particularly when stopping on an upgrade, it is customary for the operator to remove his foot from the accelerator in order to apply the brake, and, on completing the stop, to open the vehicle door to discharge or load passengers. The brake must be held applied during this period, and, on restarting of the vehicle, the foot must be quickly shifted from the brake pedal to the accelerator if the start is to be made smoothly and without allowing backward movement of the vehicle and consequent danger to following vehicles. The task of holding the brake applied during the discharge and loading period is also tiring to the driver, particularly in city vehicle operation where numerous stops are made, and, since, during this period, the accelerator is in released position and the vehicle door is opened, means are provided in the present invention for energizing the auxiliary brake valve when the accelerator and door are operated as above described, this arrangement being so constituted as to permit the operator to remove his foot from the brake pedal entirely after the vehicle has stopped, and to automatically deenergize the auxiliary valve to effect a release of the brakes when the accelerator is again depressed in starting the vehicle.

Relatively simple mechanism is provided for accomplishing this desirable end, comprising in general a pair of switches having normally closed and normally open contacts respectively and connected in series with the coil of the electro-pneumatic valve and a source of electric energy such as the vehicle battery. One of these switches 45 may be an ordinary spring closed switch suitably mounted on the vehicle and having a suitable contact opening member 46 resiliently connected to accelerator rod 9 by means of spring 47 and arm 48 carried by the rod, movement of rod 9 to the left by accelerator 7 tensioning the spring 47 to operate member 46 to open the contacts, and movement of the accelerator rod to the right, on release of the accelerator, permitting the member to again close the contacts. A spring 48* connected to the throttle valve lever 10 assists in moving the accelerator to release position. The switch 45 is provided with a contact terminal 49 connected by a conductor 50 to a battery 51, the other side of the battery being connected by a conductor 52 to terminal 53 of the coil in valve 40. A second switch 54 of the pressure responsive type more fully described and illustrated in Patent No. 2,141,689, already referred to, and having normally open contacts, is provided with a contact terminal 55 connected to coil terminal 56 of valve 40 by a conductor 57, the circuit to terminal 58 of switch 45 being completed through contact terminal 59, conductor 60 grounded on the vehicle and conductor 61 leading from the ground to terminal 58. The pressure responsive switch 54 is connected to conduit 35 by means of a conduit 62, and, in view of the foregoing description, it will be readily apparent that, on release of the accelerator pedal with a resultant closing of the contacts in switch 45, operation of valve 36 to admit fluid under pressure to fluid motor 25 to open a door of the vehicle will also connect reservoir 33 with the pressure responsive switch 54 through conduit 34, valve 36 and conduit 62, thus closing the switch, which, in cooperation with switch 45, completes the circuit from battery 51 to the electro-pneumatic valve 40 and energizes the valve to connect reservoir 41 with brake chambers 14 through conduit 42, valve 40, conduit 43, double check valve 21, and conduits 22 and 23. As a result, the rear brakes will be applied and will remain in applied position until such time as the accelerator controlled switch 45 or the pressure responsive switch 54 are opened in response to depression of the accelerator or release of fluid pressure from the door operating motor by operation of door control valve 36. From the foregoing description, it will be seen that means are provided, controlled by the accelerator and by the door control valve for controlling the application and release of the rear vehicle brakes independently of the operation of service brake valve 15, it being pointed out that this type of brake application may, if desired, be readily extended to all the brakes on the vehicle.

In the operation of vehicles equipped in the manner described, it is often desirable for reasons of safety that the vehicle door be closed prior to release of the auxiliary brake application and starting of the vehicle, and, in order that this desirable end may be attained, means are provided by the present invention so constituted as to automatically hold the brakes applied after a brake application is made through energization of the auxiliary brake valve 40, regardless of subsequent closing of the vehicle door in response to operation of the door control valve 36, thus making the release of such auxiliary brake applications dependent entirely on operation of switch 45 which is controlled by operation of the accelerator 7. In the embodiment of the invention shown, such means are illustrated as comprising a normally open pressure responsive switch 63 connected in parallel with pressure responsive switch 54 and in series with the accelerator controlled switch 45 and electro-pneumatic valve 40 by means of contact terminal 64 and conductor 65 connected to conductor 57, and contact terminal 66 and conductor 67 connected to a suitable ground on the vehicle. Switch 63 is arranged to receive fluid under pressure from the auxiliary brake system through a conduit 68 connected at one end to the switch and at the other end to conduit 43 which leads from the auxiliary brake valve 40 to double check valve 21. With the parts arranged in this manner, it will be evident that, on release of accelerator 7 and operation of valve 36 to open a vehicle door, the contacts of switches 45 and 54 will close and complete the circuit from battery 51 to energize valve 40, which in turn energizes brake chambers 14 as heretofore described, and at the same time admits fluid under pressure to switch 63 through conduits 43 and 68, thus closing the switch contacts and maintaining the electrical circuit between the battery and the electro-pneumatic valve regardless of any subsequent opening of the contacts of switch 54 due to release of fluid from the door motor 25 and switch conduit 62, and making deenergization of the valve 40 and corresponding release of the brakes entirely dependent on opening of switch 45 by operation of the accelerator pedal.

While an embodiment of the invention illustrated in the drawing has been described with considerable particularity, it is understood that the invention is not restricted thereto but is capable of receiving a variety of expressions, some of which will now readily suggest themselves to those skilled in the art, while changes may be made in the details of construction and arrangement of parts, and certain features used without other features, without departing from the spirit of the invention. Reference is, therefore, to be had to the claims hereto appended for a definition of the limits of the invention.

What is claimed is:

1. In a motor vehicle having a fluid pressure brake system and a fluid pressure door controlling mechanism, a source of fluid pressure, a brake chamber, a door operating motor, valvular means for supplying fluid pressure from said source to said chamber, a control valve for supplying fluid pressure from said source to said motor, a member for controlling the speed of the vehicle engine, an electrically-operable valve mechanism for supplying fluid pressure from said source to said chamber independently of said brake valve, and means rendered operable by operation of said control valve and movements of said member for energizing said valve mechanism.

2. In a motor vehicle having a fluid pressure brake system and a fluid pressure door operating mechanism, a source of fluid pressure, a brake chamber, a door operating motor, a brake valve for supplying fluid pressure from the source to the brake chamber, a control valve for supplying fluid pressure from the source to the door operating motor, a member for controlling the speed of the vehicle motor, an electrically-operable valve mechanism for supplying fluid pressure from the source to said brake chamber independently of said brake valve, and means rendered effective by operation of said control valve on movement of said control member to a predetermined position for energizing said valve mechanism to supply fluid pressure to said brake chamber.

3. In a motor vehicle having a fluid pressure brake system and a fluid pressure door operating mechanism, a source of fluid pressure, a brake chamber, a door operating motor, a brake valve for supplying fluid pressure from the source to said brake chamber, a control valve for supplying fluid pressure from the source to said door operating motor, a member for controlling the speed of the vehicle motor, an electrically-operable valve mechanism for supplying fluid pressure from the source to said brake chamber independently of said brake valve, means rendered effective by operation of said control valve on movement of said control member to a predetermined position for energizing said valve mechanism to supply fluid pressure to said brake chamber, and means conditioned on operation of said valve mechanism for maintaining energization thereof while the control member remains in said predetermined position.

4. In a motor vehicle having a fluid pressure brake system and a fluid pressure door operating mechanism, a source of fluid pressure, a brake chamber, a door operating motor, a brake valve for supplying fluid pressure from the source to said brake chamber, a control valve for supplying fluid pressure from the source to said door operating motor, a member for controlling the speed of the vehicle motor, an electrically-operable valve mechanism for supplying fluid pressure from the source to said brake chamber independently of said brake valve, means rendered effective on operation of said control valve to supply fluid pressure to said door operating motor for energizing said valve mechanism to supply fluid pressure to said brake chamber, means conditioned by energization of said valve mechanism for maintaining energization thereof independent of subsequent operation of said control valve, and means responsive to movement of the control member away from a predetermined position for deenergizing said valve mechanism.

5. In a motor vehicle having a fluid pressure operated brake system, a fluid pressure operated door control system and a source of fluid pressure, means including a valve for controlling fluid pressure operation of the doors, a brake valve for controlling fluid pressure operation of the brakes, an auxiliary valve for controlling the brakes independently of the brake valve, means operated by fluid pressure from the door control valve for effecting brake applying action of the auxiliary valve, means operable by fluid pressure from the auxiliary valve for maintaining the brake applying action of said valve independently of the door control valve, a throttle controlling member for the vehicle motor, and means operable on movement of said member toward throttle-opening position for discontinuing the brake applying action of said auxiliary valve.

6. In a motor vehicle having a fluid pressure system for controlling the operation of the vehicle brakes and the vehicle doors, a source of fluid pressure, a brake chamber for operating the brakes, a fluid motor for operating the doors, a connection between said source and brake chamber, a connection between said source and fluid motor, a brake valve associated with said first connection for controlling the flow of fluid pressure to and from the brake chamber, a control valve associated with said second connection for controlling the flow of fluid pressure to and from the motor, means including a third valve independent of the brake valve, and having a connection with the source for controlling the flow of fluid pressure to and from the brake chamber, a member for controlling the throttle of the vehicle motor, and means controlled by movement of the door control valve and member to one position for operating the third valve to establish and maintain a supply of fluid pressure in the brake chamber and controlled only by movement of the member to another position for operating said valve to release fluid pressure from the brake chamber.

7. The combination in a motor vehicle having service brake application and release controlling means, door controlling means and controlling means for the vehicle motor, of power means controlled by said second and third named means for effecting and maintaining a brake application independently of said first named means and controlled by said third named means for releasing said brake application.

8. The combination in a motor vehicle having service brake application and release controlling means, door controlling means and controlling means for the vehicle motor, of power means controlled by operation of said second and third named means in a predetermined manner for effecting and maintaining a brake application and controlled by subsequent operation of said third named means for releasing said brake application.

9. The combination in a motor vehicle having a fluid pressure brake actuator and control means therefor, door controlling means and an accelerator for controlling the speed of the vehicle motor, of auxiliary brake actuator control means controlled by said door controlling means and accelerator for rendering said actuator operative to effect and maintain a brake application independent of the operation of said first named control means and controlled by subsequent operation of said accelerator and independently of the door control means for releasing said brake application.

10. The combination in a motor vehicle having service brake application and release controlling means, door controlling means and controlling means for the vehicle motor, of power means controlled by said second and third named means for effecting a brake application and controlled by said third named means for releasing said brake application.

11. The combination in a motor vehicle having service brake application and release controlling means, door controlling means and controlling means for the vehicle motor, of means controlled by said second and third named means for effecting a brake application and controlled by said third named means for releasing said brake application.

12. The combination in a motor vehicle having service brake application and release controlling means, door controlling means and controlling means for the vehicle motor, of means controlled by said second and third named means for effecting a brake application and controlled by said third named means for releasing said brake application, and means operable on application of the brakes by said fourth named means for preventing release of the brakes by the operation of said door controlling means.

ROY S. SANFORD.